United States Patent
Ducarne et al.

(10) Patent No.: US 10,479,535 B2
(45) Date of Patent: Nov. 19, 2019

(54) DEPLOYMENT AND AIMING DEVICE

(71) Applicant: THALES, Courbevoie (FR)

(72) Inventors: Julien Ducarne, Cannes la Bocca (FR); Yannick Baudassé, Cannes la Bocca (FR); François Guinot, Cannes la Bocca (FR)

(73) Assignee: THALES, Courbevoie (FR)

( * ) Notice: Subject to any disclaimer, the term of this patent is extended or adjusted under 35 U.S.C. 154(b) by 301 days.

(21) Appl. No.: 15/443,932

(22) Filed: Feb. 27, 2017

(65) Prior Publication Data
US 2017/0253352 A1 Sep. 7, 2017

(30) Foreign Application Priority Data

Mar. 2, 2016 (FR) ..................................... 16 00356

(51) Int. Cl.
*B64G 1/66* (2006.01)
*B64G 1/10* (2006.01)
*F16M 11/40* (2006.01)
*F16M 13/02* (2006.01)
*B64G 1/22* (2006.01)

(52) U.S. Cl.
CPC ............... *B64G 1/66* (2013.01); *B64G 1/105* (2013.01); *B64G 1/222* (2013.01); *F16M 11/40* (2013.01); *F16M 13/02* (2013.01)

(58) Field of Classification Search
CPC .......... B64G 1/66; B64G 1/222; B64G 1/105; F16M 13/02; F16M 11/40

USPC ............ 248/569, 583, 602, 662, 480, 274.1; 52/108; 242/390.2
See application file for complete search history.

(56) References Cited

U.S. PATENT DOCUMENTS

| | | | | |
|---|---|---|---|---|
| 3,144,104 A * | 8/1964 | Weir | ....................... | E04C 3/005 182/41 |
| 3,434,674 A * | 3/1969 | Groskopfs | ............... | B64G 9/00 242/390.2 |
| 4,265,690 A * | 5/1981 | Lowenhar | ................ | H01P 3/00 156/148 |
| 6,217,975 B1 * | 4/2001 | Daton-Lovett | ........ | B65G 15/08 428/105 |

(Continued)

FOREIGN PATENT DOCUMENTS

EP 0 319 921 A2 6/1989
EP 1 676 776 A1 7/2006
(Continued)

*Primary Examiner* — Muhammad Ijaz
(74) *Attorney, Agent, or Firm* — Baker & Hostetler LLP

(57) ABSTRACT

A deployment and aiming device of an instrument comprises: a first support, a second support to receive the instrument, N mandrels, N being an integer number greater than or equal to 1, positioned around the first support, each of the N mandrels rotationally mobile relative to the first support about a mandrel axis ZN intersecting the mandrel, N linear elements, each of the N linear elements cooperating with one of the N mandrels, each of the N linear elements having first and second ends, wherein the first end of the N linear elements is fixed in the mandrel with which it cooperates at a fixing point, wherein the second end of the N linear elements is linked to the second support, such that a rotation of the mandrel about its axis ZN generates a displacement of the fixing point.

12 Claims, 11 Drawing Sheets

(56) References Cited

U.S. PATENT DOCUMENTS

| | | | |
|---|---|---|---|
| 6,256,938 B1* | 7/2001 | Daton-Lovett | F16H 19/064 138/119 |
| 9,334,915 B2* | 5/2016 | Polzer | F16F 15/0232 |
| 2008/0157548 A1* | 7/2008 | Moengen | F16M 11/40 294/68.1 |
| 2014/0230949 A1* | 8/2014 | Daton-Lovett | B64G 1/222 138/177 |
| 2015/0368903 A1* | 12/2015 | Turse | B65H 75/4402 242/407 |
| 2016/0024790 A1* | 1/2016 | Baudasse | E04C 3/005 52/108 |
| 2016/0144984 A1* | 5/2016 | Baudasse | B65H 75/364 244/172.6 |
| 2016/0226126 A1* | 8/2016 | Daton-Lovett | H01Q 1/087 |
| 2017/0253352 A1* | 9/2017 | Ducarne | B64G 1/105 |
| 2018/0128419 A1* | 5/2018 | Brown | F16M 11/40 |

FOREIGN PATENT DOCUMENTS

| | | |
|---|---|---|
| EP | 2 143 641 A1 | 1/2010 |
| EP | 2 740 669 A1 | 6/2014 |
| EP | 2 977 322 A1 | 1/2016 |
| EP | 2 977 323 A1 | 1/2016 |
| WO | 2015/068062 A1 | 5/2015 |

* cited by examiner

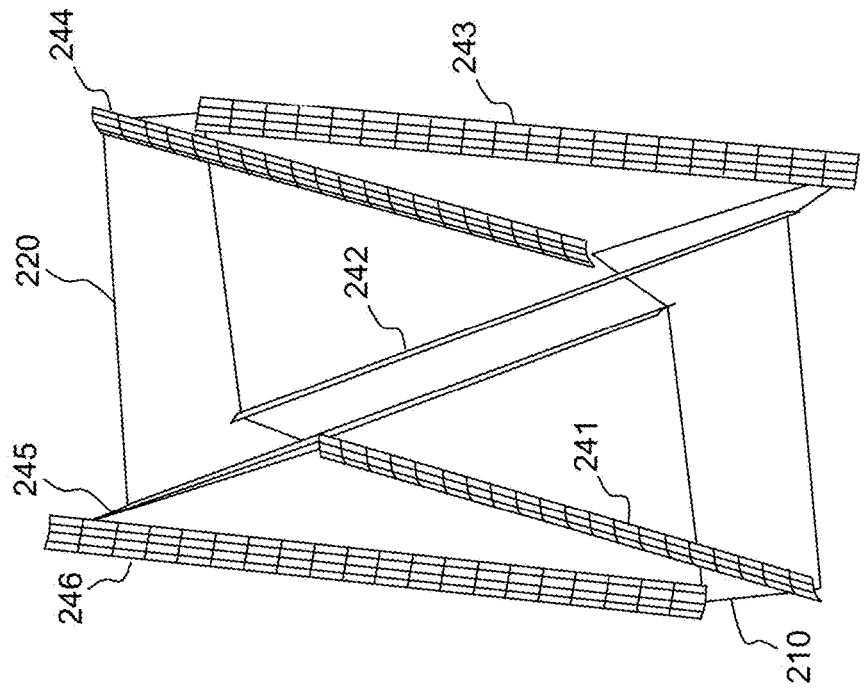
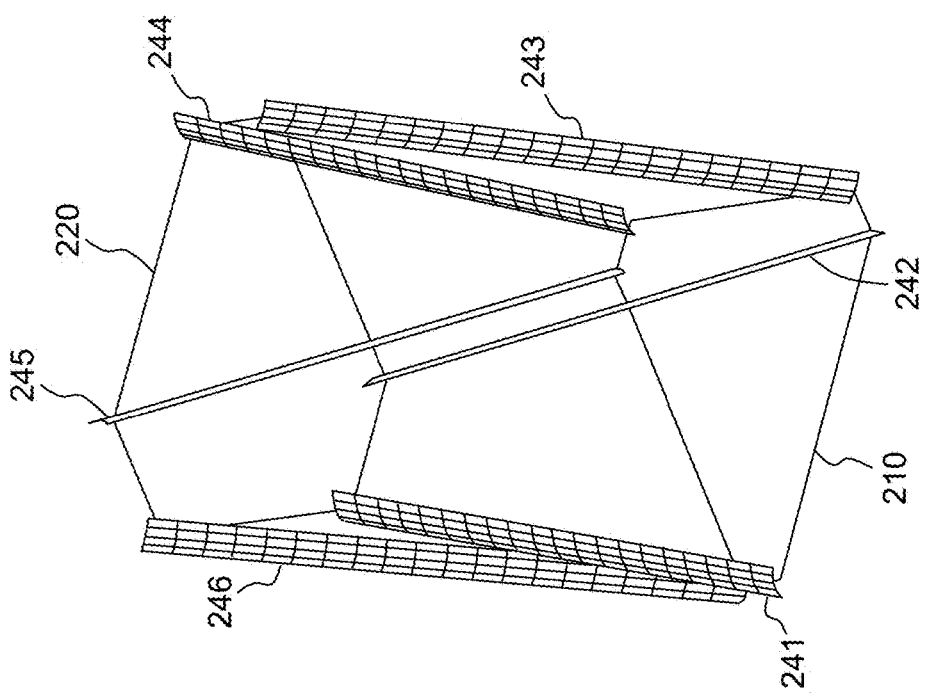

DEPLOYMENT AND AIMING DEVICE

CROSS-REFERENCE TO RELATED APPLICATIONS

This application claims priority to foreign French patent application No. FR 1600356, filed on Mar. 2, 2016, the disclosure of which is incorporated by reference in its entirety.

FIELD OF THE INVENTION

The invention relates to a stacking, deployment and aiming device intended for equipment embedded on satellites, for example, and in a nonlimiting manner, a deployment and aiming device of a telescope.

BACKGROUND

"Embedded equipment" should be understood here to mean any equipment secured at least partially to at least one satellite. It can notably be an observation instrument, intended to fulfil a space observation mission and for example consisting of one or more space telescopes, possibly distributed over a plurality of satellites, or at least one radar antenna, or else a plasma nozzle, or even a sensor.

"Space observation mission" should be understood to mean both missions intended to observe the Earth from space and missions intended to observe a part of the universe from space.

In order to fulfil space observation missions, some satellites comprise at least a part of an observation instrument, such as a space telescope for example.

Such telescopes comprise at least one deployment device, intended to hold a first element, such as a mirror (possibly of primary type, also commonly called flux collector), separated by a chosen distance from a second element, such as a mirror (possibly of secondary type) or a part of a detector, located at the focal plane where the images are formed. Such a device constitutes, with the elements that it supports, a structure with fixed geometrical configuration. The latter is dimensioned so as to withstand the mechanical stresses due to gravity and to the loads undergone during the different launch phases, and in particular on take-off of the rocket in which the satellite equipped with the device is embedded.

Once the mission has begun, the loads withstood by the structure are very low, even virtually zero. The structure therefore proves to be overdimensioned throughout its operational life, which induces an inertia, in particular transverse, that is greater than that which is actually necessary. Since this over-inertia cannot be reduced in orbit, it limits the rate of realignment of the telescope and therefore the time during it which it can acquire images, which is detrimental in particular when it is embedded on a so-called agile satellite and/or when a mosaicking has to be performed (because the field of the instrument is smaller than the field to be observed).

Furthermore, the overdimensioning of the structure is reflected in additional weight and bulk which impose the use of rockets with greater throw-weight and/or can limit the number of satellites that can be launched by one and the same rocket.

Generally, such a device constituting an structure with fixed geometrical configuration does not comprise an aiming device.

In order to have a simple and reliable deployment and aiming solution, it is desirable to limit the number of mechanisms and embedded components while maintaining an optimized telescope layout capacity.

The patent EP1676776 describes a deployable structure for a telescope based on the use of tape springs notably offering an advantage of compactness compared to the non-deployable solutions. However, the fine aiming is ensured by an ancillary device made up of linear actuators. In other words, the aiming device is independent of the deployment device. Consequently, this type of device necessitates the use of an additional device, and therefore of a large number of components. The result thereof is that the rigidity chain and the accuracy are degraded. Furthermore, such a solution is disadvantageous in terms of bulk and of weight. Finally, it has a significant cost of industrialization.

SUMMARY OF THE INVENTION

The aim of the invention is to produce a deployment and aiming device of an instrument that does not include the drawbacks of the existing devices, that has the advantage of being of little bulk, simple to produce, exhibiting an optimization of the volume of the device when it is stored under the nosecone of a launch vehicle, that allows stacking capability without using any additional holding device, control of the deployment and that allows a rigidity and a stability of the device when it is deployed without using any additional holding device as well as a capacity for fine aiming of the instrument without any additional aiming device.

The invention aims to mitigate all or some of the above-mentioned problems by proposing a deployment and aiming device of an instrument that ensures the deployment and the stacking of the instrument and the fine aiming of the instrument simply and reliably.

To this end, the subject of the invention is a deployment and aiming device of an instrument comprising a first support, a second support intended to receive the instrument, N mandrels, N being an integer number greater than or equal to 1, positioned around the first support, each of the N mandrels being rotationally mobile relative to the first support about a mandrel axis ZN intersecting said mandrel, N linear elements, each of the N linear elements cooperating with one of the N mandrels, each of the N linear elements having a first and a second ends. According to the invention, the first end of the N linear elements is fixed in the mandrel with which it cooperates at a fixing point, and the second end of the N linear elements is linked to the second support, such that a rotation of said mandrel about its axis ZN generates a displacement of the fixing point.

Advantageously, each of the N mandrels is eccentric about the mandrel axis ZN intersecting said mandrel.

Advantageously, each of the N linear elements is capable of switching from a configuration wound around the mandrel with which it cooperates about the mandrel axis ZN intersecting said mandrel to a configuration deployed according to the deployment axis XN substantially at right angles to the mandrel axis ZN, and vice versa.

According to one embodiment, each of the N mandrels is configured so as to have a minimum radius capable of allowing the linear element cooperating with said mandrel to be wound without damaging it.

According to another embodiment, at least one of the N mandrels is a cylindrical wheel about a wheel axis, the mandrel axis ZN intersecting said mandrel being substantially parallel to the wheel axis and off-centre relative to the wheel axis.

According to another embodiment, the second end of the N linear elements is linked to the second support so as to linearly guide the second support by rotation of the N mandrels in deployed configuration.

According to another embodiment, the device according to the invention comprises N contact elements, each of the N contact elements cooperating with one of the N linear elements, each of the N contact elements being configured to oppose the lifting of the linear element with which it cooperates relative to the mandrel with which the linear element cooperates.

Advantageously, the N linear elements are tape springs.

According to another embodiment, N is equal to 6, the N linear elements forming three pairs of two linear elements, and two linear elements of a pair constitute two non-parallel sides of a trapezium once placed in their deployed configuration.

According to another embodiment, N is equal to 6, the N linear elements forming three pairs of two linear elements, and two linear elements of a pair constitute two sides of a triangle once placed in their deployed configuration.

Advantageously, the linear elements of each pair are of identical length such that the corresponding trapezium is of isosceles type.

Advantageously, the linear elements of each pair are of identical length such that the corresponding triangle is of isosceles type.

The invention relates also to a space equipment item comprising at least one such device.

BRIEF DESCRIPTION OF THE DRAWINGS

The invention will be better understood and other advantages will emerge on reading the detailed description of an embodiment given by way of example, the description being illustrated by the attached drawing in which:

FIGS. 11a and 11b schematically represent another exemplary embodiment of a deployment and aiming device according to the invention.

For clarity, the same elements will bear the same references in the different figures.

DETAILED DESCRIPTION

Figure 1:
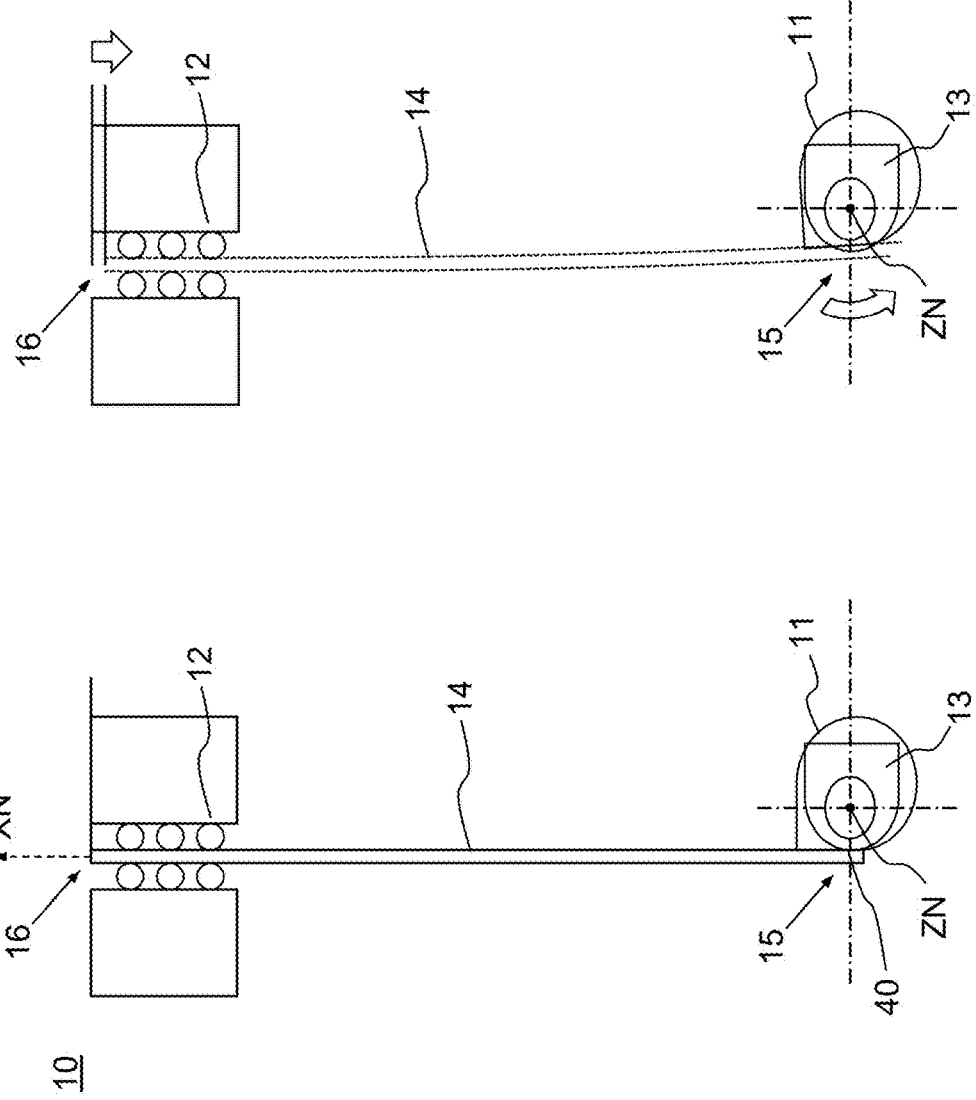
FIGS. 1a and 1b schematically represent the principle allowing a fine aiming of an instrument by deformation of a linear element according to the invention.

It is considered hereinbelow that the space instrument item is an observation instrument such as a telescope embedded on an observation satellite, for example of agile type. However, the invention is not limited to this type of space equipment item. In effect, it can be an observation instrument made up of a plurality of telescopes distributed over a plurality of satellites flying in formation, or else a radar antenna comprising a first element such as a reflector and a second element such as a feed. It could also concern so-called plasma nozzles intended to control the attitude of the satellite and having to be deployed once the satellite is in orbit, so as to augment the lever arm in order to reduce the forces to be applied. It can also concern sensors of which a part, intended for data acquisition, has to be separated from the satellite once the latter is placed in its orbit, so as not to be subjected to an electromagnetic or simply electrical interference.

In this application, the mandrel denotes a rotating part with a winding surface on which it is possible to wind, totally or partially, a linear element such as a tape spring, a blade, a tube or cylindrical bar, even a plate.

FIGS. 1a and 1b schematically represent the principle allowing a fine aiming of an instrument by deformation of a linear element according to the invention. The device 10 represented in FIGS. 1a and 1b is a deployment and aiming device of an instrument (not represented in FIGS. 1a and 1b) comprising a mandrel 11, a guiding element 12, a first support 13 intended to guide the mandrel 11, about a mandrel axis ZN intersecting said first support 13. The device 10 comprises a linear element 14 cooperating with the mandrel 11, the linear element having a first end 15 and a second end 16. According to the invention, the first end 15 of the linear element 14 is fixed to the mandrel 11 with which it cooperates at a fixing point 40, the second end 16 of the linear element is linked to the guiding element 12, such that a rotation of said mandrel about its axis ZN generates a displacement of the fixing point 40. The mandrel 11 can be a cam of free form or be eccentric about the mandrel axis ZN intersecting said mandrel 11.

Figure 2:
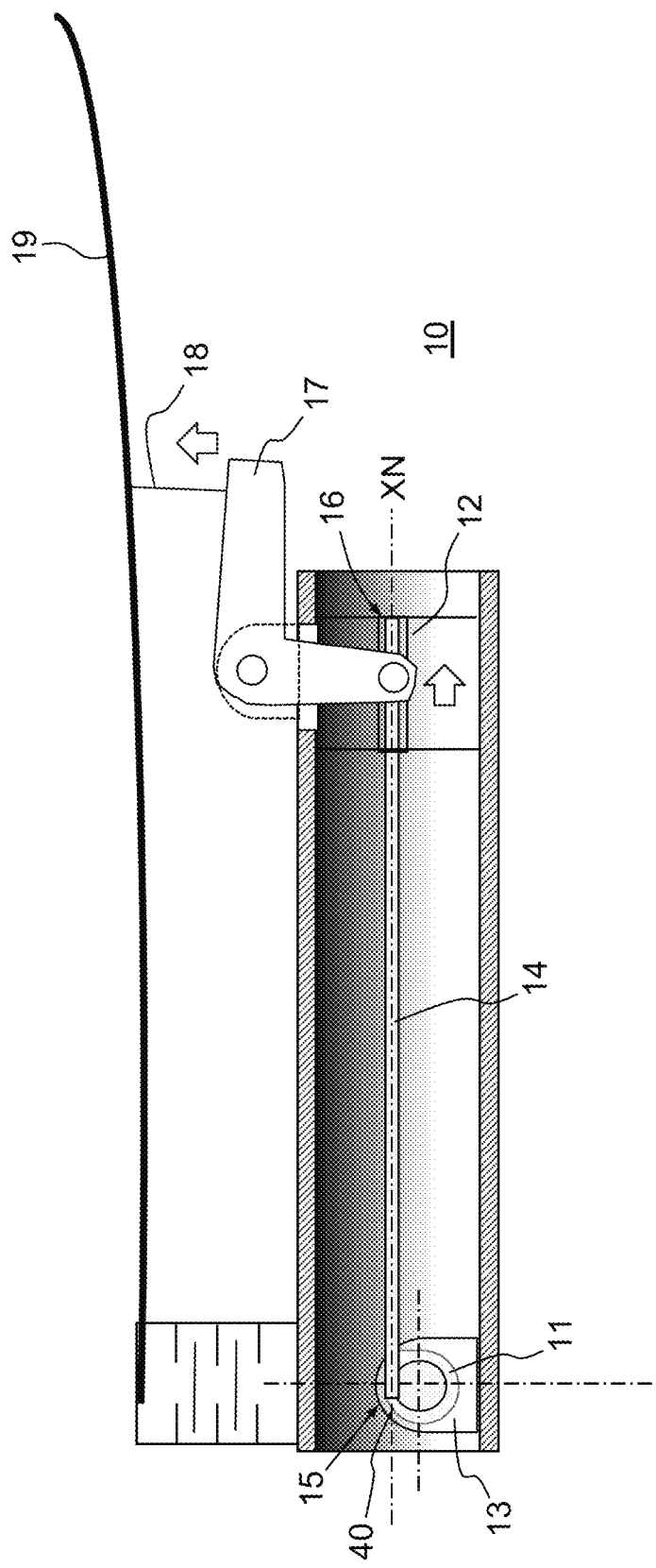
FIG. 2 schematically represents an exemplary application of a fine aiming device according to the invention.

The guiding element 12 can be produced in different ways. It can relate to a quasi-linear guidance, for example with balls (as schematically represented in FIG. 1) or with double blades or membranes (as schematically represented in FIG. 2). In this case, the translational actuation takes place in the vicinity of the end 16. These elements (balls, blades, membranes, etc.) make it possible to guide the second end 16 of the linear element 14.

In the context of a hexapod, the guidance consists of the five other linear elements over a complex trajectory.

The guiding element 12 can be linked to a second support intended to receive an instrument, as illustrated in FIG. 2.

The linear element 14 can for example be a bar, a blade, a plate or a tape spring.

It can be noted that the linear element 14 can take two distinct positions. In other words, the linear element can be capable of switching from a configuration in which it is wound, totally or partially, around the mandrel 11 about the mandrel axis ZN to a configuration deployed according to the deployment axis XN, and vice versa. In the case presented in FIGS. 1a and 1b, the linear element 14 can be in so-called bowed configuration, that is to say after a slight rotation of the mandrel 11 as indicated by the arrow in FIG. 1b, for which the linear element 14 folds slightly back on itself and does so equally in the positive or negative direction of rotation of the mandrel 11. Also, the linear element 14 can be in deployed configuration according to the axis XN. The two distinct positions that the linear element 14 can take depend on the nature of the linear element. A plate or a bar is preferentially used for a configuration in which the plate or the bar bow lightly on themselves. A tape spring or a flexible blade is advantageously used when a totally wound configuration is desired, that is to say when there is a desire for the linear element 14 to be wound completely around the mandrel 11 in the case of a need for complete retraction of the element 14 and no longer only over a small portion.

Thus, once in locked position, with a rotation of the mandrel 11, the linear element 14 being embedded in the mandrel 11 and fixed at its second end 16 to the guiding element 12, the linear element 14 is linearly deformed. In other words, the guiding element 12 is guided linearly relative to the mandrel 11, as indicated by the arrows in FIG. 1b. From a rotation at the mandrel 11 level, a translation is obtained at the level of the guiding element 12. Since this linear guiding is based on the deformation of a linear element, a high degree of accuracy is obtained with respect to the linear displacement of the guiding element 12. In other words, a micro-oscillation at the mandrel 11 generates a displacement of the fixing point and thus, by deformation of the linear element 14, a fine aiming of the guiding element 12.

The form and the size of the section of the linear element 14 are chosen as a function of the desired displacement of the support and of the torque imparted at the mandrel by a motor providing the motor drive of the mandrel 11. The section depends also on the load applied to the support, that is to say on the type of object to be displaced, and on the offset of the axis ZN relative to the axis of the linear element 14.

FIG. 2 schematically represents an exemplary application of a fine aiming device 10 according to the invention. The first end 15 of the linear element 14 is embedded in the mandrel 11, the second end 16 of the linear element is guided by the guiding element 12. By combining a mechanism with the guiding element 12, for example a lever 17 and a blade 18, it is possible to displace an instrument 19, for example, here, an antenna. The rotation of the first support 13 results in the deformation of the linear element 14 which generates a displacement at the level of the linear guiding element 12. The guiding element 12 moves the lever 17 which pulls or pushes the blade 18 in order to displace the instrument 19.

There is no departure from the scope of the invention if any other mechanism for transmitting movement between the guiding element 12 and the instrument 19 is used. In the exemplary application, the instrument 19 is an antenna, but can be any other instrument like a mirror, a laser, etc.

Figure 3:
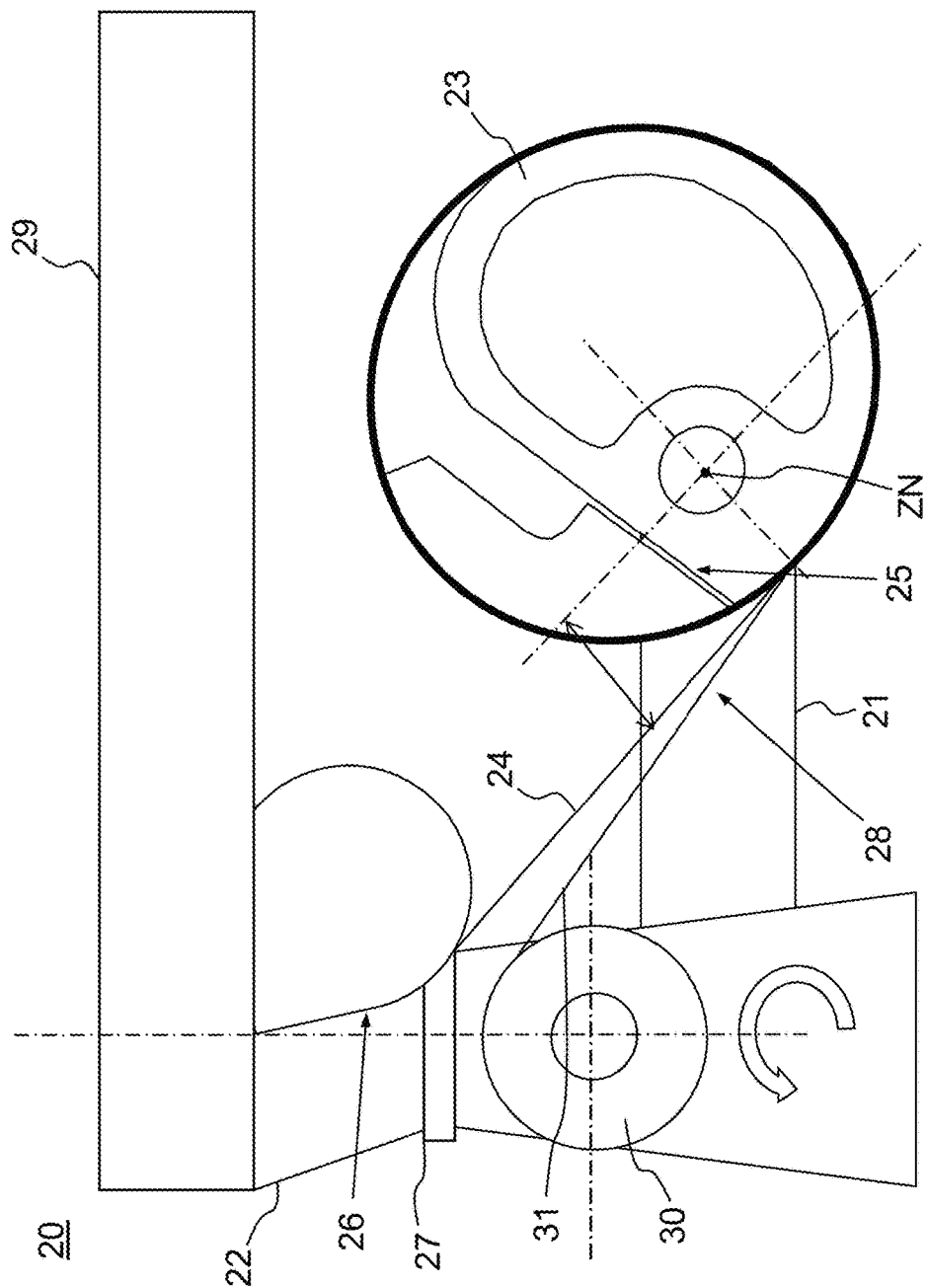
FIG. 3 schematically represents an embodiment of a deployment and aiming device in stowed configuration according to the invention.

FIG. 3 schematically represents an embodiment of a deployment and aiming device 20 in stowed position according to the invention. The deployment and aiming device 20 of an instrument 19 comprises a first support 21, a second support 22 intended to receive the instrument 29, a mandrel 23 positioned around the first support 21, rotationally mobile relative to the first support 21 about a mandrel axis ZN intersecting the mandrel 23. The device 20 comprises a linear element 24 cooperating with the mandrel 23, the linear element 24 having a first end 25 and a second end 26. According to the invention, the first end 25 of the linear element 24 is fixed in the mandrel 23 with which it cooperates at a fixing point, the second end 26 of the linear element is linked to the second support 22, such that a rotation of the mandrel 23 about its axis ZN generates a displacement of the fixing point. As in the configurations illustrated in FIGS. 1 and 2, the second end 26 of the linear element 24 is guided by a guiding element linked to the second support 22. Thus, the rotation of the mandrel 23 creates the movement of the linear element 24 which is guided at its second end 26 by the guiding element linked to the second support.

The mandrel 23 can notably be a cam of free form or the mandrel 23 can be eccentric about the mandrel axis ZN intersecting the mandrel 23.

Advantageously, the linear element 24 is a tape spring. In this case, the linear element 24 is capable of switching from a configuration in which it is wound, here totally, around the mandrel 23 about the mandrel axis ZN to a deployed configuration according to the deployment axis XN, and vice versa.

As represented in FIG. 3, the mandrel 23 is configured so as to have a minimum radius capable of allowing the winding of the linear element 24 cooperating with said mandrel 23 without damaging it. This configuration addresses the bulk constraints of the mandrel with its linear element wound around it in the wound position and to the strength constraints that the linear element must exhibit. Thus, the mandrel 23 is ideally configured so as to have a radius that is small enough to be not too bulky, but not too small so as to have a certain curvature allowing the linear element to be wound around this curvature without being damaged, notably at the winding surface of the mandrel 23 where the linear element 24 is embedded since it is precisely at that point that it undergoes the greatest stresses in the transition from embedment in the mandrel to being wound around the mandrel. In the case of a multiple-strand winding, the maximum stress is situated at the last winding, in the zone at the tape exit.

Advantageously, the mandrel 23 is a cylindrical wheel about a wheel axis, the mandrel axis ZN intersecting said mandrel 23 being substantially parallel to the wheel axis and off-centre relative to the wheel axis. In wound configuration, the axis ZN of the mandrel is deliberately positioned in proximity to the linear exit of the linear element 24. This makes it possible to guarantee a significant effort despite a reduced torque.

It can be noted that the mandrel is not necessarily a cylindrical wheel, the mandrel can be a cam of free form.

In wound configuration of the linear element 24, the instrument 29 is held pressed against a block 27. With the axis ZN of the mandrel 23 being positioned in proximity to the linear exit of the linear element 24, the holding of the linear element 24 and therefore of the instrument 29 in position is assured.

Advantageously, the device 20 comprises a contact element 28 cooperating with the linear element 24, the contact element being configured to oppose the lifting of the linear element 24 with which it cooperates relative to the mandrel 23 with which the linear element 24 cooperates. In FIG. 3, the contact element consists of a flexible blade wound around a pulley 30, the contact element 28 being in fact produced by the contact of an element 31 that can be wound around the pulley 30, for example a blade or a tape, on the linear element 24 at the linear exit of the linear element 24 at the level of its mandrel 23. This contact opposes the lifting of the linear element 24 relative to the mandrel 23. In other words, the contact element 28 guarantees that the linear element 24 does not tilt in wound configuration and also upon the deployment of the linear element 24.

The invention is not limited to the contact element produced by means of a pressing pulley. The contact element can also be produced by any other means, spot or surface type, for example by means of one or more needles, one or more winding rollers or one or more magnetic elements, without departing from the scope of the invention. The pulley must be motorized relative to its support in order to keep the blade 31 permanently under tension. A spiral spring can be used, or an additional driving system (cables and pulleys or gear systems for example) can be used, making it possible to limit the need in terms of angular capacity of the spring in the case of a large number of turns.

Figure 4:
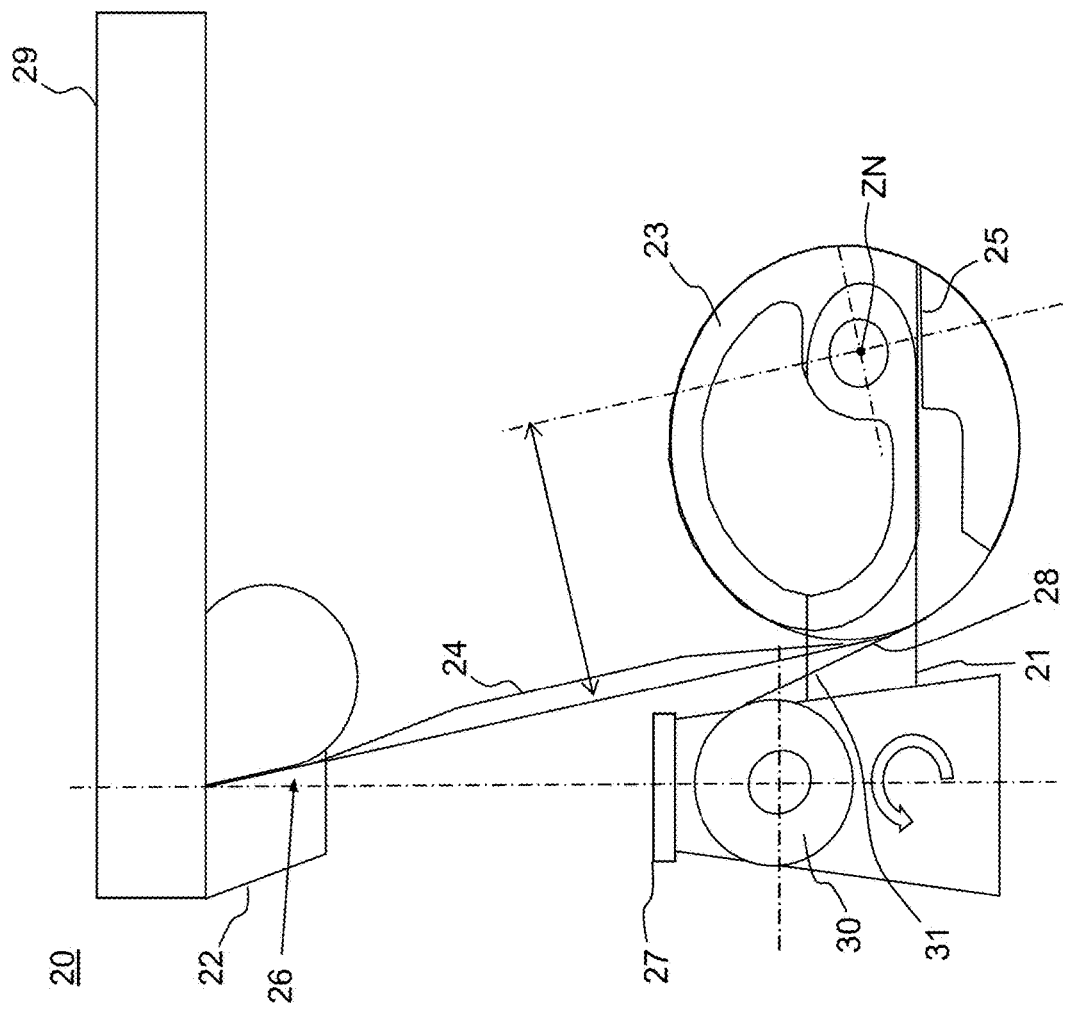
FIG. 4 schematically represents an embodiment of a deployment and aiming device during deployment according to the invention.

FIG. 4 schematically represents the deployment and aiming device 20 during deployment according to the invention. Compared to the representation of FIG. 3, the mandrel 23 has performed a rotation about its axis ZN. The linear element 24 is being deployed, that is to say it is switching from its configuration wound around the mandrel 23 to a deployed configuration (not yet reached in FIG. 4). During the deployment, because of the eccentricity of the mandrel 23, the radius of rotation of the mandrel is variable, but the deployment quality is not in any way affected thereby. The contact element 28 makes it possible to guarantee that the linear element 24 does not tilt during its deployment. With the deployment of the linear element 24, the distance between the support 21 and the support 22 increases.

Figure 5:
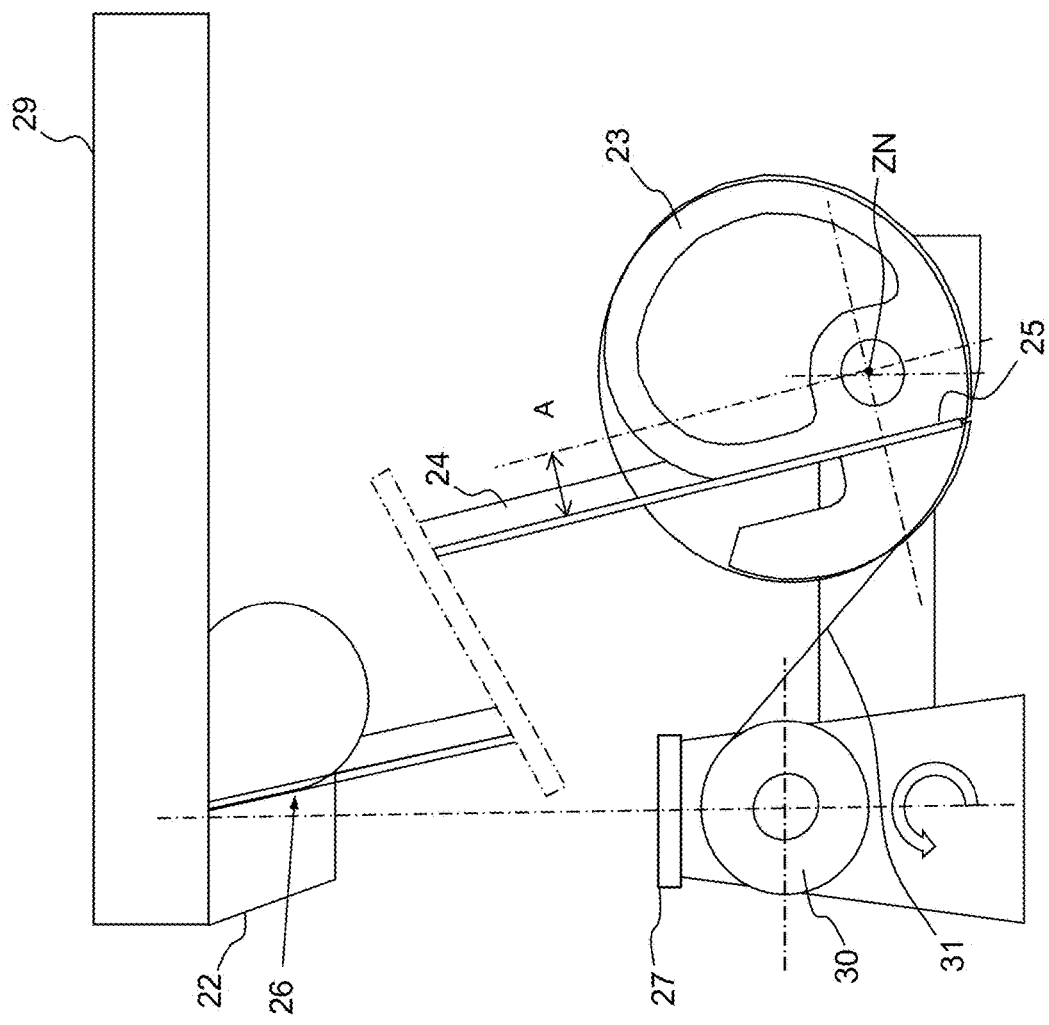
FIG. 5 schematically represents an embodiment of a deployment and aiming device in deployed position according to the invention.
Figure 6:
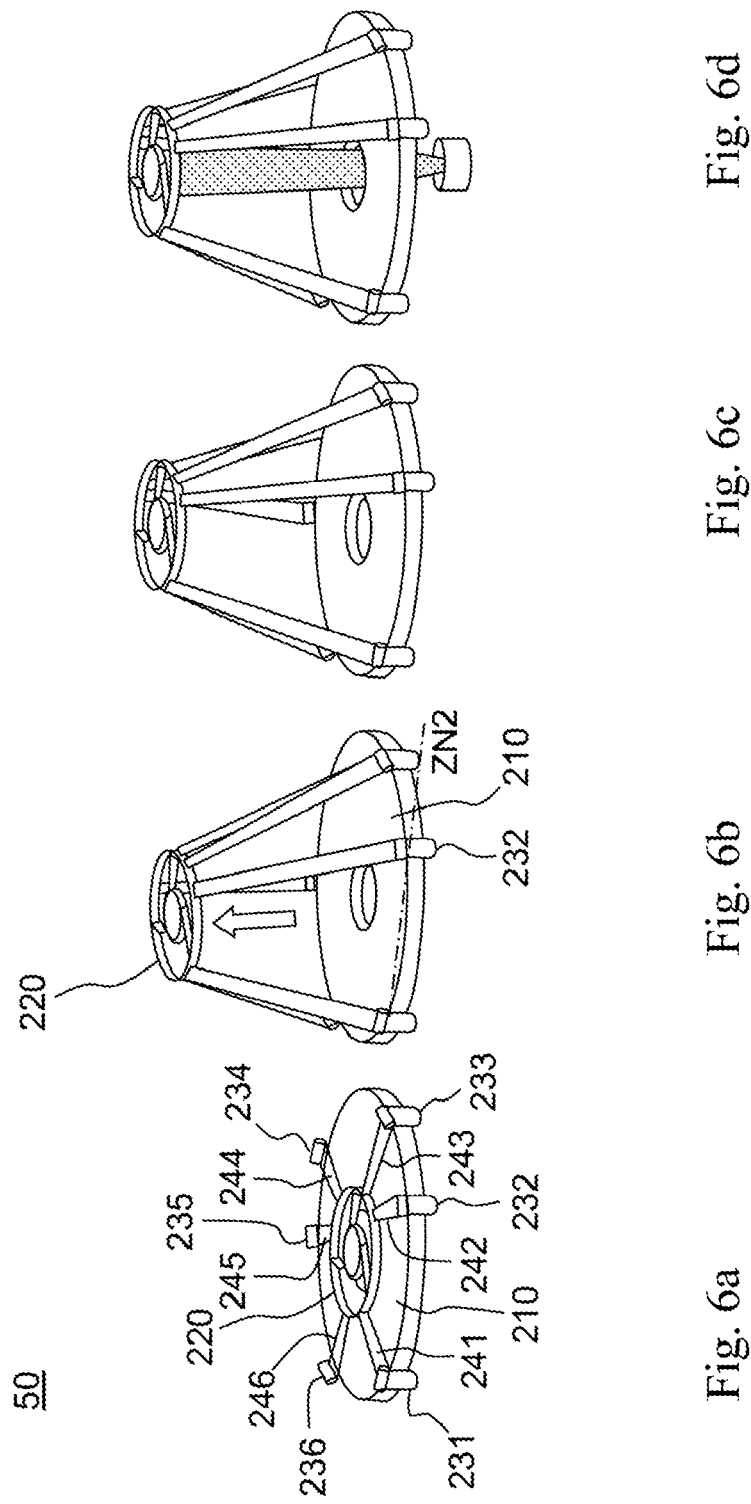
FIGS. 6a-6d schematically represent an embodiment of a deployment and aiming device with six linear elements according to the invention.

FIG. 5 schematically represents the deployment and aiming device 20 in deployed position according to the invention. Compared to the representation of FIG. 4, the mandrel 23 has continued its rotation about its axis ZN. The linear element 24 is now in deployed configuration. In the case where the linear element 24 is a tape spring, the latter clicks and assumes a rigid position, also called locked position. In deployed configuration of the linear element 24, the distance between the support 21 and the support 22 is the distance desired for the use of the device, for example for an observation mission. In deployed configuration, the axis ZN of the mandrel 23 is advantageously in proximity to the linear exit of the linear element 24. Thus, by the embedment of the first end 25 in the mandrel 23 and of the second end 26 in the second support 22, the linear element 24 is said to be locked at both its ends. The pressing pulley 30 no longer has a role to play since the linear element 24 is locked.

The positioning of the axis ZN of the mandrel 23 in proximity to the linear exit of the linear element 24 makes it possible to guarantee a significant accuracy in the aiming of the instrument 29. In effect, in deployed configuration, the linear element 24 is completely deployed and rigid, its two ends 25, 26 are embedded respectively in the mandrel 23 and in the second support 22. Since the second support 22 is capable of receiving an instrument 29, it is then possible to perform a fine aiming of the instrument 29 by micro-oscillations at the mandrel 23 level, for example by actuators. The micro-oscillations produced at the mandrel 23 level, that is to say the first end 25 of the linear element 24, are reflected at the level of the second sup-port 22, that is to say via the second end 26 of the linear element 24. In other words, being embedded at both its ends, the linear element 24 will, from a microrotation at one end 25, provoke a displacement at the support 22 at its other end 26 by its deformation. As explained previously in FIGS. 1a and 1b, with a rotation of the mandrel 23, the linear element 24 being embedded in the mandrel 23 and linked at its second end 26 to the second support 22, the linear element 24 is deformed linearly. In other words, the support 22 (and therefore the instrument 29) is set in motion relative to the mandrel 23. In the case of a hexapod, the other legs offer a complex guidance, quasi-linear, at the support 22 level. From a rotation at the mandrel 23 level, a quasi-linear movement is obtained at the support 22 level. Since this linear guidance is based on the deformation of a linear element 24, a high degree of accuracy is obtained in the linear displacement of the support 22, and therefore of the instrument 29. In other words, a micro-oscillation at the mandrel 23 generates a fine aiming of the support 22 and therefore of the instrument 29.

The form and the size of the section of the linear element 24 are chosen according to the desired displacement of the support 22 and of the torque supplied at the mandrel 23 level by a motor allowing the motorization of the mandrel 23. The section depends also on the load applied to the support 22, that is to say on the type of instrument 29 to be aimed. The offset value between the motor axis and the tape axis also has a great impact.

The basic principle of the invention has been explained with two supports 21, 22, a linear element 24 and a mandrel 23. The invention applies also to two supports 21, 22 with two linear elements and two mandrels, or three linear elements and three mandrels and, more generally, with N linear elements and N mandrels (one mandrel per linear element), N being an integer number greater than or equal to 1.

FIGS. 6a-6d schematically represent an embodiment of a deployment and aiming device 50 with six linear elements 241, 242, 243, 244, 245, 246 according to the invention. The device 50 comprises a first support 210 and a second support 220 intended to receive an instrument. It comprises six mandrels 231, 232, 233, 234, 235, 236 positioned around the first support 210. Each of the six mandrels 231, 232, 233, 234, 235, 236 is rotationally mobile relative to the first support 210 about a mandrel axis ZN1, ZN2, ZN3, ZN4, ZN5, ZN6 intersecting the corresponding mandrel. For example, the axis ZN2 intersects the mandrel 232, around which the linear element 242 is wound and deployed. The six mandrels can be uniformly distributed around the first support 210 or distributed non-uniformly around the first support 210. Depending on the type of first support 210, the mandrels can also be positioned on the first support 210.

The mandrels can be positioned either tangentially or radially relative to the main sight axis.

In wound configuration, the distance between the first support 210 and the second support 220 is very small, even zero if the second support 220 is directly in contact with the first support 210. In deployed configuration, each of the linear elements 241, 242, 243, 244, 245, 246 is locked. The distance between the two supports is the desired distance. Because of the distribution of the mandrels 231, 232, 233, 234, 235, 236 around the first support 210 and of the locking of the linear elements 241, 242, 243, 244, 245, 246, by imparting micro-oscillations on one of the mandrels, or on two or more, or even on all the mandrels, as explained previously, it is possible, by deformation of the locked linear element concerned (or the locked linear elements concerned), to produce a fine aiming of the support 220. To do this, each of the mandrels has an associated gear motor in order to rotationally drive the mandrel. In the context of a space application on a satellite, the gear motors can be on a fixed deck and thermally coupled to the body of the satellite.

This configuration has the advantage of allowing a good heat dissipation when the deployment and aiming device is deployed.

Thus, the device according to the invention allows, with a minimum of components, the deployment and the stacking of an instrument by virtue of the linear elements, advantageously tape springs, and of the mandrels positioned at the base of each linear element. It also allows the fine aiming of the instrument based on the deformation of the linear element or elements, the number of linear elements being able to be chosen notably according to the allowable bulk and the desired stiffness. The mandrel(s) have an important role since they are both a stowage tool for the linear element or elements, a tool for unwinding the linear element or elements and finally they allow the fine control of the positioning of the instrument by micro-rotations. The fine aiming is obtained according to six degrees of freedom of the second support 220 by a relation linking the three rotations and three translations of the support 220 to the position of the six actuators at the instrument 29. The geometry of the set of linear elements and mandrels can be chosen to adapt this relationship to the fine aiming needs.

The use of tape springs as linear elements offers the additional advantage of allowing the device to be nested if necessary.

Figure 7:
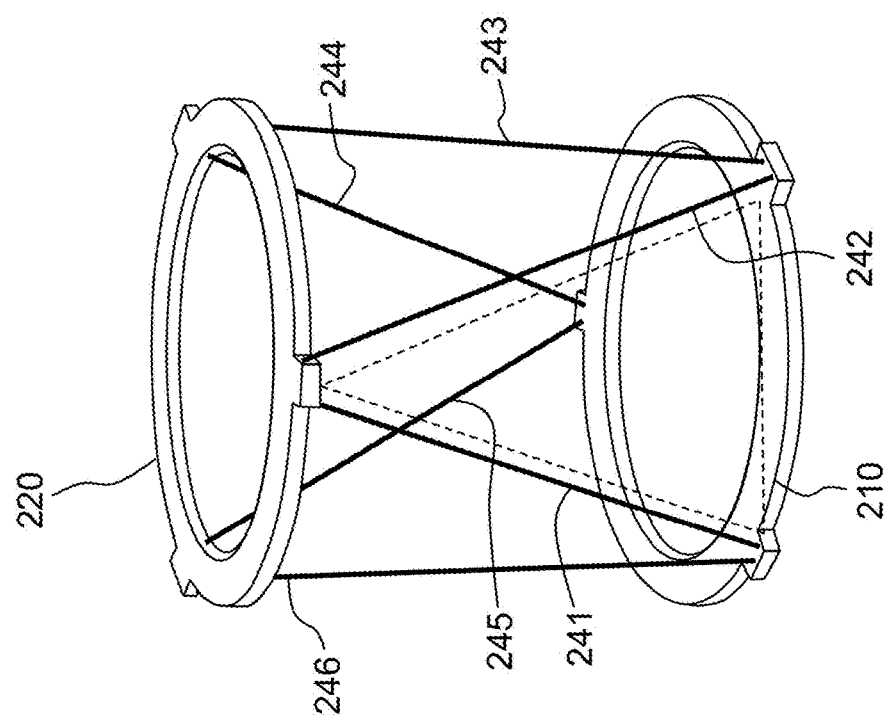
FIG. 7 schematically represents an exemplary embodiment of a deployment and aiming device according to the invention comprising six linear elements.

FIG. 7 schematically represents an exemplary embodiment of a deployment and aiming device according to the invention comprising six linear elements. The six linear elements 241, 242, 243, 244, 245, 246 form three pairs of two linear elements, and two linear elements of a pair, for example 241 and 242 and/or 243 and 244, etc., constitute two sides of a triangle once placed in their deployed configuration.

Because of this particular arrangement, the two linear elements 241, 242 of a pair create forces whose vector components contribute to establishing an equilibrium in the plane of the figure. The overall equilibrium is then ensured by the cooperation of the three pairs of blades whose second ends are distributed shrewdly at the periphery of the second support 220. More specifically, the second ends are here secured to fixing lugs which are placed substantially at 120° relative to one another.

Advantageously, the linear elements of each pair are of identical length such that the corresponding triangle is of isosceles type. This equilibrium is then optimized when the linear elements of the different pairs are of identical lengths, and therefore the corresponding triangles are of isosceles type. In this configuration, in case of uniform expansion of the linear elements, the movement of the deployed element is reduced.

Figure 8:
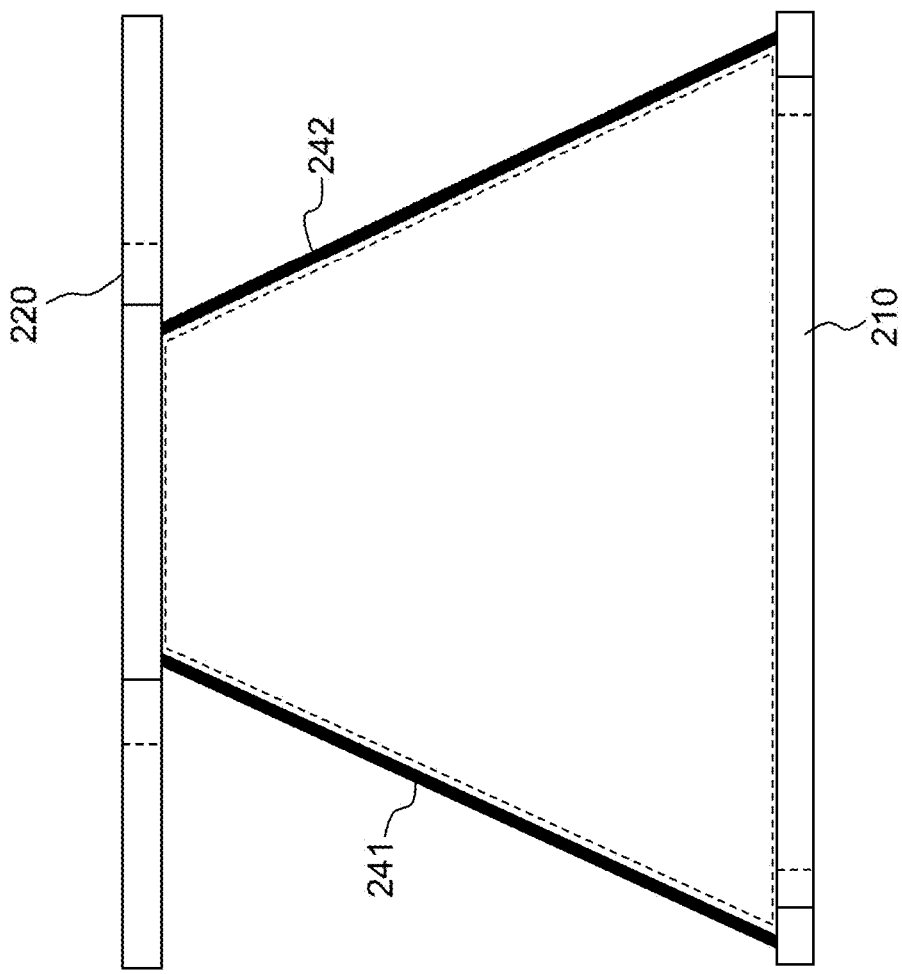
FIG. 8 schematically represents another exemplary embodiment of a deployment and aiming device according to the invention.

FIG. 8 schematically represents another exemplary embodiment of a deployment and aiming device according to the invention. Here there can be seen two linear elements 241, 242 of a pair constituting two non-parallel sides of a trapezium once placed in their deployed configuration.

Advantageously, the linear elements of each pair are of identical length such that the corresponding trapezium is of isosceles type. As in the case of the triangles, the equilibrium of the device is optimized when the linear elements of the different pairs are of identical lengths.

Figure 9:
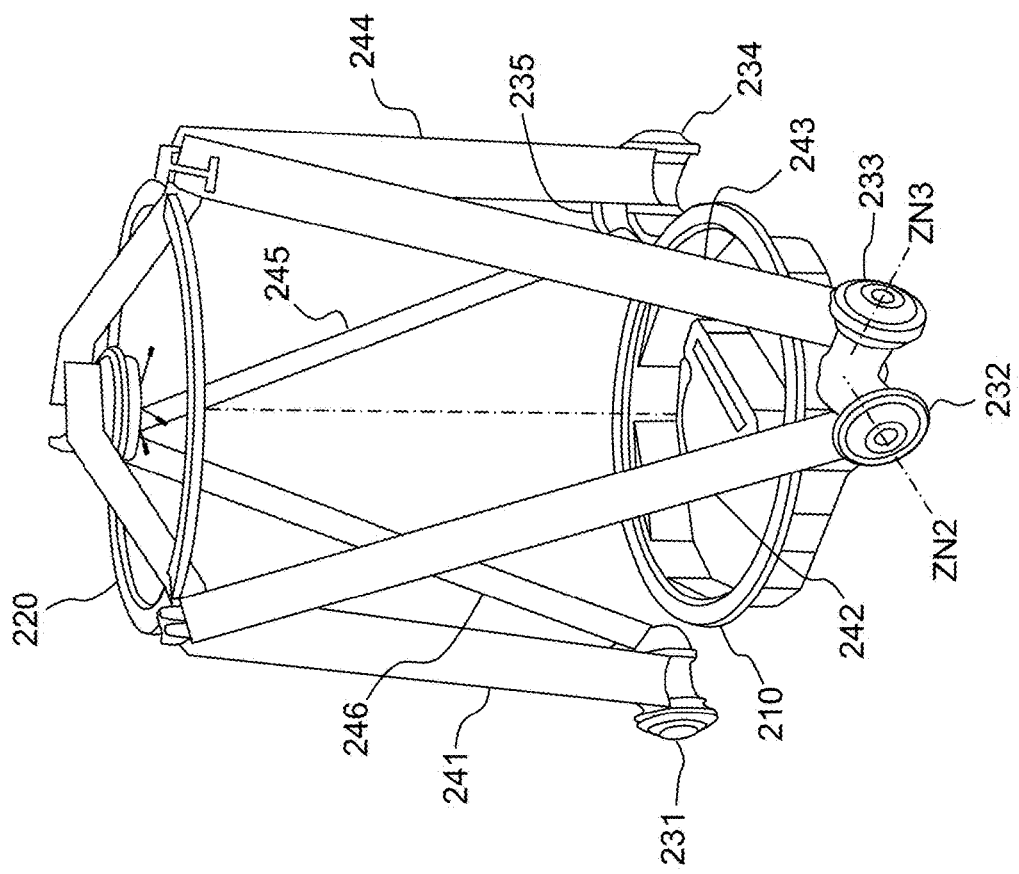
FIG. 9 represents an embodiment of a deployment and aiming device according to the invention comprising three pairs of linear elements, two linear elements of a pair constituting two sides of a triangle once placed in their final respective positions.

FIG. 9 represents an embodiment of a deployment and aiming device 50 according to the invention comprising three pairs of linear elements, two linear elements of a pair constituting two sides of a triangle once placed in their final respective positions. The six mandrels 231, 232, 233, 234, 235, 236 are positioned around the first support 210.

Advantageously, the chosen geometry makes it possible to have, for all the steps of the deployment, the deployment axis in the plane of symmetry of the linear elements.

This configuration lends itself to a linear embedment of each of the second ends of the linear elements 242, 243 at the level of the second support 220 and facilitates the translation of the second support 220 relative to the first support 210 upon the deployment of the linear elements by using the flexing thereof in their plane of symmetry.

The embodiments of FIGS. 7, 8, 9 are presented by way of example. There is no departure from the scope of the invention with a different positioning and/or number of the linear elements.

Figure 10B:
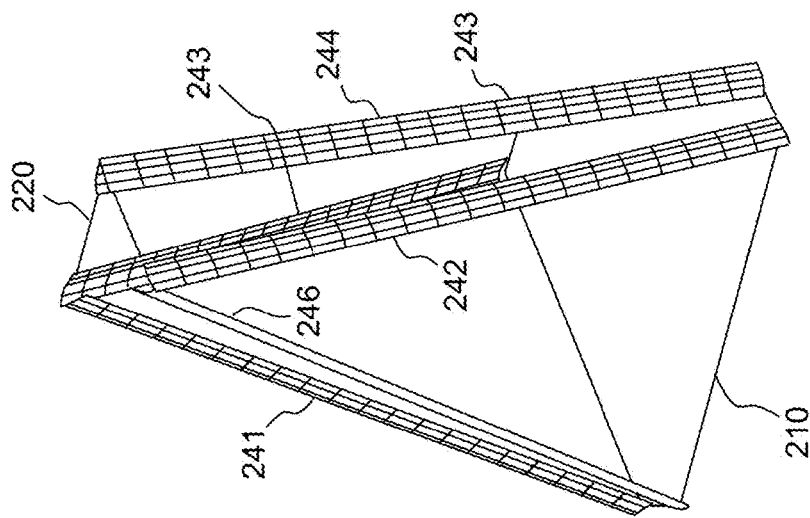
FIGS. 10a and 10b schematically represent another exemplary embodiment of a deployment and aiming device according to the invention.
Figure 10A:
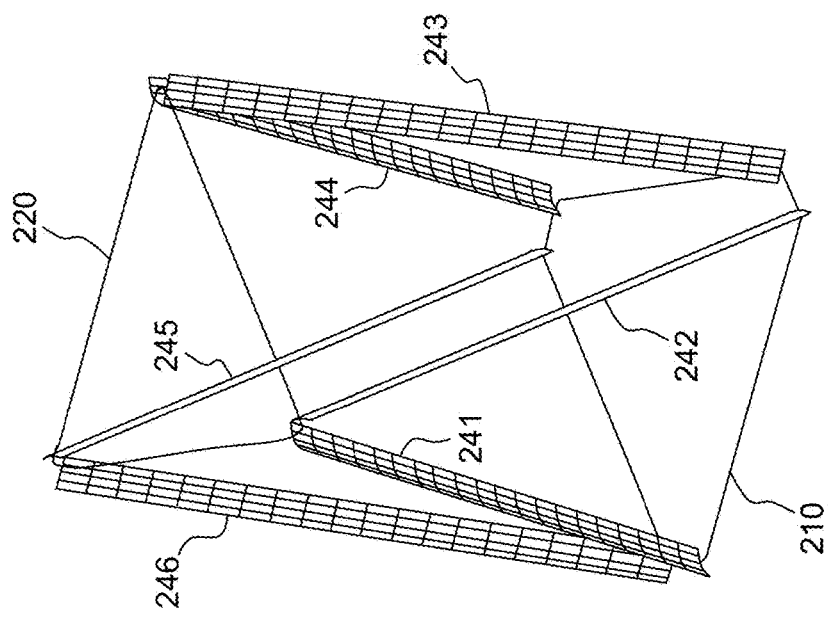

FIGS. 10a and 10b schematically represent another exemplary embodiment of a deployment and aiming device according to the invention. The two devices of FIGS. 10a and 10b each comprise six linear elements. The six linear elements 241, 242, 243, 244, 245, 246 form three pairs of two linear elements, and two linear elements of a pair, for example 241 and 242 and/or 243 and 244, etc., constitute two sides of a triangle once placed in their deployed configuration. These two figures clearly illustrate the fact that, in deployed position, the linear elements can form triangles positioned such that the plane containing their surface is at right angles to the plane containing the surface of the support 210, but not necessarily, as can be seen in FIG. 10a.

Moreover, the invention applies also with a second support 220 of size and form that can vary, notably for a saving in terms of bulk, as can be seen in FIG. 10b.

FIGS. 11a and 11b schematically represent another exemplary embodiment of a deployment and aiming device according to the invention. The two devices of FIGS. 11a and 11b each comprise six linear elements. The six linear elements 241, 242, 243, 244, 245, 246 form three pairs of two linear elements, and two linear elements of a pair, for example 241 and 242 and/or 243 and 244, etc., constitute two non-parallel sides of a trapezium once placed in their deployed configuration. These two figures clearly illustrate the fact that, in deployed position, the linear elements can form trapeziums of any form positioned such that the plane containing their surface is at right angles to the plane containing the surface of the support 210, but not necessarily, as can be seen in FIG. 11a.

Moreover, the invention applies also with a second support 220 of size and form that can vary, notably for a saving in terms of bulk, as can be seen in FIG. 11b. To this end, it is also possible to offset one linear element in every two in the axis of deployment to emphasize this space saving.

The invention relates also to a space equipment item comprising a deployment and aiming device 10, 20 or 50 of an instrument as described previously.

The invention claimed is:

1. A deployment and aiming device of an instrument comprising:
   a first support,
   a second support intended to receive the instrument,
   at least one mandrel positioned around the first support, each of the at least one mandrel being rotationally mobile relative to the first support about a mandrel axis (ZN) intersecting said mandrel,
   at least one linear element, each of the at least one linear element engaging with at least one of the at least one mandrel, each of the at least one linear element having a first and a second end,
   wherein the first end of the at least one linear element is fixed in the at least one mandrel with which it engages at a fixing point, and wherein the second end of the at least one linear element is linked to the second support, such that a rotation of said at least one mandrel about its axis (ZN) generates a displacement of the fixing point, and wherein each of the at least one mandrel is eccentric about the mandrel axis (ZN) intersecting said at least one mandrel.

2. The device according to claim 1, wherein each of the at least one linear element is capable of switching from a configuration wound around the mandrel with which it engages about the mandrel axis (ZN) intersecting said mandrel to a configuration deployed according to a deployment axis (XN) substantially at right angles to the mandrel axis (ZN), and vice versa.

3. The device according to claim 1, wherein each of the at least one mandrel is configured so as to have a minimum radius capable of allowing the linear element engaging with said mandrel to be wound without damaging it.

4. The device according to claim 1, wherein at least one of the at least one mandrel includes a cylindrical wheel portion having a center defining a wheel axis, the mandrel axis (ZN) intersecting said mandrel being substantially parallel to the wheel axis and off-centre relative to the wheel axis.

5. The device according to claim 2, wherein the second end of the at least one linear element is linked to the second support so as to linearly guide the second support by rotation of the at least one mandrel in deployed configuration.

6. The device according to claim 1, comprising one or more contact elements, each of the one of more contact elements engaging with one of the at least one linear element, each of the one of more contact elements being configured to oppose the lifting of the linear element with which it engages relative to the mandrel with which the linear element engages.

7. The device according to claim 1, wherein the at least one linear element are tape springs.

8. The device according to claim 2, wherein the at least one mandrel comprises 6 mandrels and the at least one linear element comprises 6 linear elements, the six linear elements forming three pairs of two linear elements, and wherein two linear elements of a pair constitute two non-parallel sides of a trapezium once placed in their deployed configuration.

9. The device according to claim 2, wherein the at least one mandrel comprises 6 mandrels and the at least one linear element comprises 6 linear elements, the six linear elements forming three pairs of two linear elements, and wherein two linear elements of a pair constitute two sides of a triangle once placed in their deployed configuration.

10. The device according to claim 8, wherein the linear elements of each pair are of identical length such that the corresponding trapezium has non-parallel sides of equal length.

11. The device according to claim 9, wherein the linear elements of each pair are of identical length, such that the corresponding triangle is of isosceles type.

12. A space equipment comprising a deployment and aiming device of an instrument comprising:
a first support,
a second support intended to receive the instrument,
at least one mandrel positioned around the first support, each of the at least one mandrel being rotationally mobile relative to the first support about a mandrel axis (ZN) intersecting said at least one mandrel,
at least one linear element, each of the at least one linear element engaging with one of the at least one mandrel, each of the at least one linear element having a first and a second ends,
wherein the first end of the at least one linear element is fixed in the at least one mandrel with which it engages at a fixing point, and wherein the second end of the at least one linear element is linked to the second support, such that a rotation of said at least one mandrel about its axis (ZN) generates a displacement of the fixing point,
and wherein each of the at least one mandrel is eccentric about the mandrel axis (ZN) intersecting said at least one mandrel.

* * * * *